United States Patent [19]

Kridl et al.

[11] Patent Number: 4,499,129
[45] Date of Patent: Feb. 12, 1985

[54] PARTIALLY RECOVERABLE CLOSURE

[75] Inventors: Thomas A. Kridl, Union City; Carney P. Claunch, Redwood City; Ann O. Bjornstrom, Menlo Park, all of Calif.

[73] Assignee: Raychem Corporation, Menlo Park, Calif.

[21] Appl. No.: 541,944

[22] Filed: Oct. 14, 1983

[51] Int. Cl.³ .......................... F16L 0/00; H01R 4/00
[52] U.S. Cl. .................................... 428/36; 156/56; 156/86; 174/92; 174/DIG. 8
[58] Field of Search ...................... 156/84–86, 156/49, 56; 174/DIG. 8, 92; 428/36

[56] References Cited

U.S. PATENT DOCUMENTS 4,221,926  9/1980  Schneider ........................... 156/86
4,384,906  5/1983  Molinari ............................. 156/86
4,436,566  3/1984  Tight ................................... 156/56

Primary Examiner—Mary F. Downey
Assistant Examiner—James J. Seidleck
Attorney, Agent, or Firm—Herbert G. Burkard; T. Gene Dillahunty; Dennis E. Kovach

[57] ABSTRACT

A wraparound recoverable closure, wherein a portion of the closure is not recovered against a substrate, which has a flap to seal across the gap between the abutting edge portions of the closure. Where the closure does not recover against and contact a substrate, the flap does not seal adequately for some applications. This invention provides means for supporting the flap to improve the seal. The preferred embodiment is a bag inside the closure which contains a resilient liner which supplies pressure on the flap to seal the flap across said gap.

2 Claims, 3 Drawing Figures

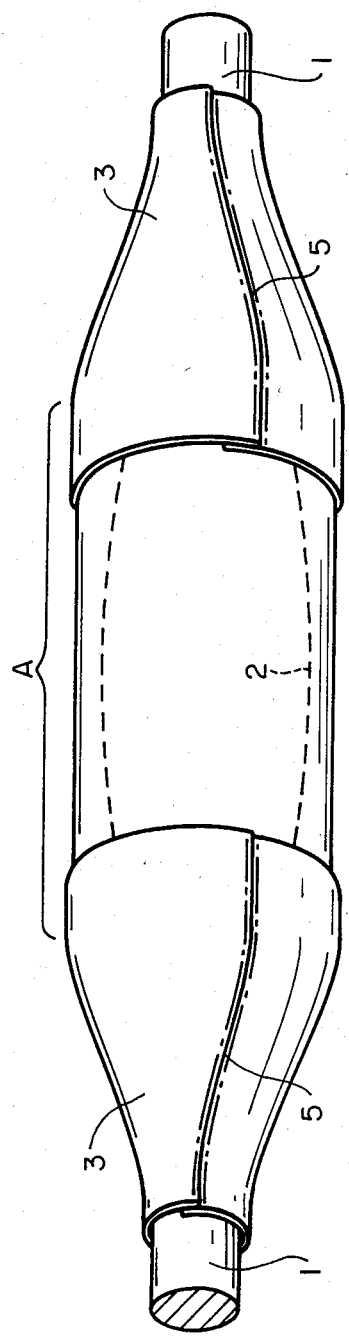
FIG_1
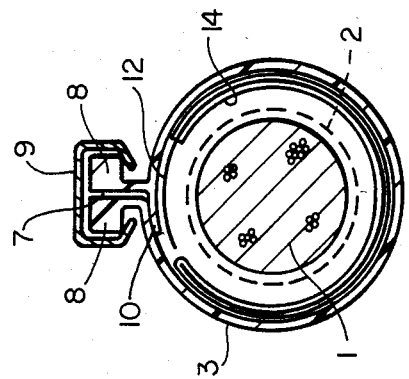
FIG_3
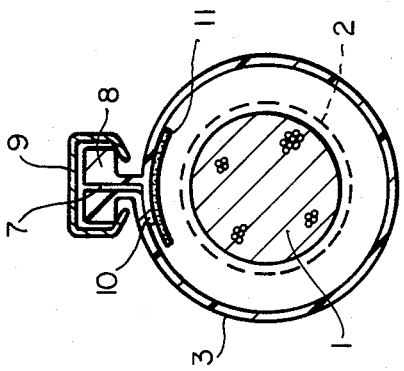
FIG_2

PARTIALLY RECOVERABLE CLOSURE

BACKGROUND OF THE INVENTION

This invention relates to recoverable wraparound closures having longitudinal edge regions such as rails which can be brought together around a substrate, such as a cable, and having closure means for holding those edge regions together in abutting position. Such wraparound closures frequently have a flap which extends from one of the edge regions underneath the gap between the two abutting edge regions of the closure. These flaps are of various configurations to perform the function of assuring the seal of the gap between the abutting edge portions of the wraparound closure. Examples of such flaps are shown in the following commonly-assigned copending applications which are incorporated herein by reference. In U.S. Ser. No. 388,791, now U.S. Pat. No. 4,436,566, filed June 15, 1982, the flap underlying the gap between the edge regions of the wraparound closure includes means for forcing adhesive into the gap to assure proper seal. In U.S. Pat. No. 4,384,906 issued May 24, 1983 and copending application U.S. Ser. No. 415,670 filed Sept. 17, 1982, a flap is shown which is formed from the wraparound sheet itself. In copending Application U.K. Ser. No. 8,236,056 filed Dec. 17, 1982, the flap has a certain configuration to assure structural integrity and to avoid damage to the flap during the recovery of the wraparound closure. Another example of the flap extending from one edge of a wraparound closure is shown in U.S. Ser. No. 517,542 filed July 25, 1983.

In another form of closure, a flap is not used. Examples of such closures are those for pressurized splice cases which have internal rigid frame around which the wraparound closure is placed. The end portions of such wrap-arounds are either mechanically closed or recovered to seal the ends around the substrate. The seal between the edge portions which are abutted together to form the closure in these pressurized splice applications is accomplished by an independent sealing member which is attached to the rigid frame. An example of such configuration is shown in copending application U.S. Ser. No. 483,017 filed Apr. 7, 1983, and in U.S. Ser. No. 308,886 filed Oct. 5, 1981.

It is also common to use a liner in conjunction with recoverable wraparound closures to provide a base or a substrate without uneven surfaces or protrusions for the recoverable wraparound to shrink down against and form the required seal and environmental protection. The liners are designed to perform various functions, such as heat-shielding during recovery, and are placed on the cable or substrate, compressed to the appropriate size around the splice bundle, then secured in place usually with plastic tape. The wraparound is then placed around the substate and liner and recovered to engage the liner and the exposed portion of the substrate by shrinking down against the liner and the substrate. An example of such a liner is shown in copending application U.S. Ser. No. 401,177 filed July 23, 1982. The liners are also used in aid in re-entry of the closure, such as the liner configuration disclosed in copending application U.S. Ser. No. 341,407 filed Jan. 21, 1982.

Description of the Invention

It has now been recognized that it is desirable to have wraparound closures which do not recover along the entire length of the closure. For example, it is desirable to have a wraparound closure which only shrinks at the end portions thereof to engage a substrate such as a cable but not shrink in the middle portion of the wraparound. One of the reasons for not having the center portion of the wraparound closure recover is to minimize or eliminate the application of heat in the center portion where heat may damage critical parts such as individual wire splices. It has also been found desirable to install a wraparound closure which recovers by heating only the end portions. It is also desirable not have the rigid frame within the closure such as those used in the pressurized splice cases discussed above.

An example of a wraparound closure which only recovers on the end portions thereof and does not have substantial recovery in the center portion thereof is shown in copending application U.S. Ser. No. 493,445 filed May 11, 1983. It has been found that in internally heated recoverable closures, it is sometimes preferred not to heat the center section of the closure and thereby not recover the center section of the wraparound closure. While some heating is usually applied along the abutted edge portions to assure sealing of a hot melt type sealant or adhesive, the center portion does not shrink or recover to an appreciable amount. The center portion does not recover sufficiently to engage the liner or splice bundle of the substrate.

It has been unexpectedly found that when the center portion of the wraparound closure is not shrunk down against a substrate or liner, the flap does not always provide sufficient sealing of the gap between the abutted edge portions of the closure. This invention provides for a resilient support means for the flap at least along the portion of the closure which does not shrink down against a rigid substrate or a liner. The resilient support means of this invention need only supply sufficient pressure against the flap to assure sealing of the flap against the adjacent or opposite portion of the sleeve of the closure contacted by the flap thereby sealing the flap across the gap between the abutted edges of the closure. In a preferred embodiment of this invention, the resilient support means need only supply sufficient pressure on the flap to assure the sealing of a hot melt adhesive or other type sealant during the initial heating of the closure to recover the end portions of the closure. When such hot melt adhesive or sealant is present, the resilient support means for the flap need not continue to provide such pressure on the flap after the adhesive or sealant has cooled and formed the permanent seal.

The support means for supporting the flap according to this invention may be any resilient metal or plastic material capable of providing sufficient force on the flap to assure sealing the flap across the gap formed by the abutting edges of the wraparound closure. Such support means may extend out from the substrate or the liner to engage the flap and provide the required pressure on the flap. In a preferred embodiment of this invention, a relatively stiff but flexible liner, such as a polypropylene liner, is used and is attached, usually with an adhesive, directly to the wraparound closure. A portion of the liner thereby extends underneath and beyond the flap in this configuration when the wraparound closure is placed around the substrate. The liner attached to the inside of the closure is simultaneously wrapped around the substrate to provide the necessary protection of the substrate and simultaneously provide the support for the flap. An additional advantage of this preferred embodiment is that it reduces the number of parts the craftsman must handle in order to complete the installation wraparound closure in the field.

Another preferred embodiment of the present invention involves attaching an open envelope to the inside of the wraparound closure where the opening is in the direction of the flap. The liner, such as the above-mentioned polypropylene liner, is then inserted into the open envelope whereby the liner is then contained partially within the envelope and with a portion of the liner extending beyond the envelope and underneath and beyond the flap. Optionally the envelope may extend to the full length of the liner or may be longer than the liner and sealed to prevent the liner from sliding out of the envelope during handling and installation of the closure. In this configuration the envelope would also extend underneath and beyond the flap. The further advantage of this embodiment of the invention is the ease of re-entry of the closure and the re-usability of the liner after re-entry.

BRIEF DESCRIPTION Of The FIGURES

FIG. 1 shows the wraparound closure of the invention covering a splice bundle;

FIG. 2 is a cross-sectional view, illustrating an embodiment of the invention; and FIG. 3 is a cross-sectional view, illustrating the preferred embodiment of this invention.

Referring now to the drawings now to further illustrate this invention,

FIG. 1 shows a wraparound closure 3 around substrate cable 1 having a splice bundle 2 which is to be protected and sealed by the wraparound closure 3. In FIG. 1 center portion A of wraparound closure 3 is not recovered. Only the end portions outside a portion A are recovered to engage substrate cable 1 to form a seal at each end of the closure. The wraparound closure is closed at seam 5.

FIG. 2 shows the wraparound closure 3 around cable substrate 1 and around splice bundle 2 which is sometimes uneven and asymmetrical. FIG. 2 illustrates a common closure method for the wraparound closure which is channel 9 around edge rails 8 to hold the edge portion rails in abutting position forming gap 7 between the edge portions of the closure. Flap 10 is provided to seal the gap 7 and support member 11 which is attached by an adhesive to the closure. Support member 11 is of a resilient nature extends underneath and past flap 10 to provide sufficient outward force on flap 10 to assure a seal of gap 7.

FIG. 3 illustrates the preferred embodiment of this invention wherein envelope or bag 14 is attached by adhesive to the inside of closure 3 and liner 12 is inserted into the envelope. This preferred configuration provides a liner to protect the splice bundle 2 and the liner 12 extends from the end of envelope 14 underneath flap 10 to provide support for flap 10 to assure a seal of gap 7. In the preferred embodiment it has been found that a convenient material for the envelope 14 is a material such as a polyester film/aluminum laminate available from DuPont under the MYLAR trademark and a useful material for liner 12 is polypropylene which has a sufficient resilience to provide adequate force on flap 10. Polypropylene having a thickness of about 0.030 to about 0.150 inches is preferred depending on the diameter of the installed closure and depending on the use of coining or thinning in the liner. It will be recognized that the wraparound closure 3 with the attached bag or envelope 14 and the liner 12 can be initially made and assembled in a flat sheet configuration. When the wraparound is placed around the cable and splice bundle, the curvature of liner 12 will normally provide sufficient force to support flap 10. Alternatively, liner 12 can be manufactured in an appropriate shape to provide the required force for sealing flap 10. For example, the closure, envelope and liner can be supplied in a curved configuration to make installation easier for the craftsman and the liner still be of sufficient stiffness or appropriate shape to provide the required force to flap 10.

We claim:

1. A wraparound closure having:
    longitudinal edge regions which can be brought together to form a closure around a substrate;
    a closure means for holding the edge regions in abutting position;
    a flap extending from one edge region underneath the abutting area of the edge regions to provide a seal of the gap between the abutting edge regions; and
    wherein a portion of the wraparound closure recovers to a decreased diameter to engage the substrate and wherein a portion of the wraparound closure does not significantly recover to engage the substrate,
    the improvement comprising resilient support means engaging the flap to provide sufficient pressure on the flap to assure sealing of the flap across the gap between the abutting edge regions, the resilient support means for the flap being partially positioned within an open envelope with the envelope being attached to the closure in its place prior to recovery of the closure.

2. The wraparound closure of claim 3 wherein the resilient support means is a polypropylene liner.

* * * * *